United States Patent [19]
Hirano

[11] 3,948,498
[45] Apr. 6, 1976

[54] FLUID FILLED SPRING DAMPER INCLUDING FLEXIBLE END WALL
[75] Inventor: Takeshi Hirano, Yokohama, Japan
[73] Assignee: NHK Spring Co., Ltd., Yokohama, Japan
[22] Filed: June 6, 1974
[21] Appl. No.: 477,096

[30] Foreign Application Priority Data
Sept. 25, 1973  Japan.................. 48-111593[U]

[52] U.S. Cl................. 267/35; 188/298; 267/65 R; 277/177; 308/3.5; 308/237 R; 308/DIG. 4
[51] Int. Cl............................................ B60g 11/62
[58] Field of Search .... 188/298, 322; 267/35, 65 R; 308/3.5, 237, 238, 239, DIG. 4; 277/177; 248/22, 358 R

[56] References Cited
UNITED STATES PATENTS
| 2,387,065 | 10/1945 | Harding | 188/298 X |
| 2,808,277 | 10/1957 | Binder | 308/3.5 |
| 3,368,807 | 2/1968 | Thrasher | 188/298 X |
| 3,784,179 | 1/1974 | Sugiura | 267/35 |

FOREIGN PATENTS OR APPLICATIONS
| 1,249,285 | 11/1960 | France | 188/322 |
| 892,576 | 3/1962 | United Kingdom | 188/322 |

Primary Examiner—George E. A. Halvosa
Attorney, Agent, or Firm—Cushman, Darby & Cushman

[57] ABSTRACT

A cap member is fitted in a liquid-tight fashion to the open end of a cylinder. The cap member has a flexible member made of rubber etc. A piston rod connected to a piston within the cylinder is slidably inserted through the cap member. When an impact load is applied to the piston rod the piston rod and thus the piston are forced into the interior of the cylinder to cause an operational medium pressure to be increased to permit the flexible member to be resiliently deformed outward. As a result, a shock due to the impact load is absorbed.

9 Claims, 9 Drawing Figures

FLUID FILLED SPRING DAMPER INCLUDING FLEXIBLE END WALL

BACKGROUND OF THE INVENTION

This invention relates to a damper of piston-cylinder type used as a stock absorbing means.

It is well known that as various shock absorbing devices including a bumper mounted on a rolling stock, for example, an automobile use is made of a piston-cylinder type damper having an operational medium filled in a liquid-tight fashion into the interior of a cylinder.

With such a damper the pressure of an operational medium is changed due to the variation of an inner volume of a cylinder as caused by the reciprocating movement of a piston or due to a temperature variation. In an attempt to control such pressure change in a suitable way and improve or stabilize the shock absorbing function of the damper, an air chamber is provided within the cylinder. The air chamber is designed to be contacted directly with the operational medium or be contacted indirectly with the operational medium through a partition wall, such as a free piston, slidably disposed within the cylinder. In the former case, a direction in which a damper is mounted is restricted. For example, a damper designed to be used in an upright state can not be used in a horizontal direction. In the latter case, when the partition wall is slidably moved along the inner surface of the cylinder, no smooth movement is effected. Furthermore, it is very difficult to attain a complete seal between the outer peripheral surface of the partition wall and the inner surface wall of the cylinder and there is a fear that air will be introduced into the operational medium.

SUMMARY OF THE INVENTION

It is accordingly the general object of this invention to provide a damper free from drawbacks accompanying the prior art damper. With a damper according to this invention a flexible member is incorporated as at least one component into a cap member which is fitted to the open end portion of the cylinder to permit the interior of the cylinder to be sealed in a liquid-tight fashion. As a piston rod and thus a piston are forced into the interior of the cylinder due to an impact load on the piston rod, the pressure of an operational medium is increased to cause the flexible member to be resiliently deformed outward, thereby compensating for an inner volume decrease corresponding to that volume of the piston rod which is forced into the interior of the cylinder. Therefore, the pressure of the operational medium is substantially kept constant and a shock due to the impact load is very efficiently absorbed.

In another embodiment, a cylindrical guide cover is slidably mounted over the open end of the cylinder so that the piston rod can be stably moved in the axial direction of the cylinder. In a further embodiment a flexible member is fitted through an outer cylindrical member to the open end portion of the cylinder in a manner to be offset toward the interior of the cylinder. The flexible member has its outer cylindrical member side made wider than its inner cylindrical member side. This permits a load applied on the flexible member to be uniformly distributed. Therefore, a lengthy service life of the damper is assured.

To explain in more detal, the object of this invention is to provide a damper having an excellent shock absorbing characteristic.

Another object of this invention is to provide a durable damper having a simple construction.

Another object of this invention is to provide a stably operable damper which is little affected by ambient temperature.

Further object of this invention will be understood from the following description of the preferred embodiments and by reference to the accompanying drawings.

DESCRIPTION OF THE PREFERRED EMBODIMENTS

Figure 1:
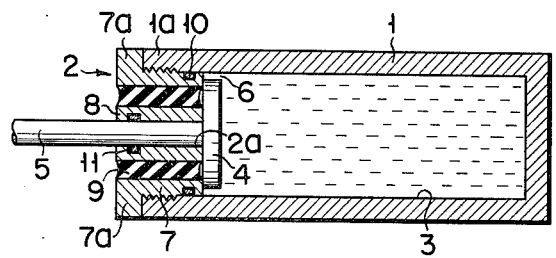
FIG. 1 is a cross sectional view of a damper according to a first embodiment of this invention, in which a piston is in an initial position.
Figure 2:
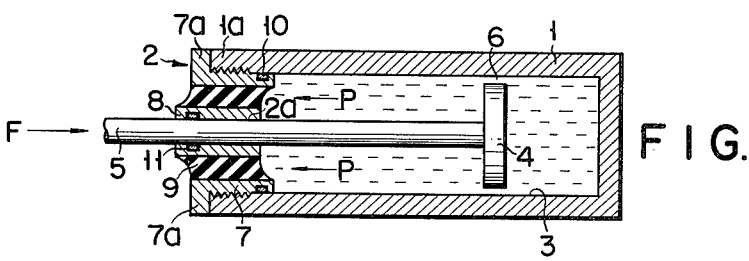
FIG. 2 is a cross sectional view of the damper of FIG. 1, in which the piston is in an operative state.
Figure 3:
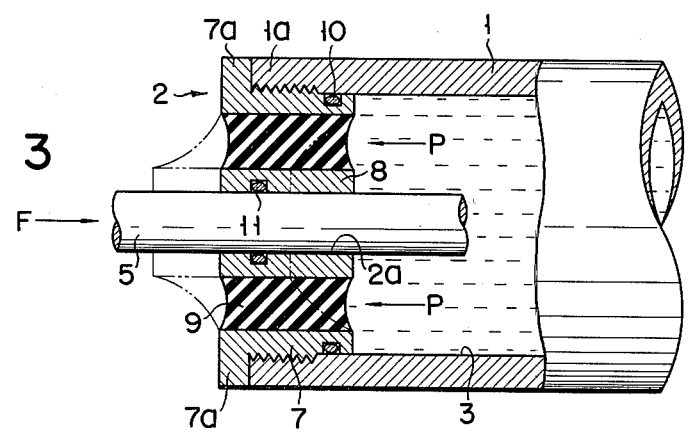
FIG. 3 is a partial, enlarged view of the damper of FIG. 1.

A damper according to a first embodiment of this invention is shown in FIGS. 1 to 3. To the open end 1a of a cylinder 1 an end cap member 2 as set out below is fitted in a liquid-tight fashion. Within the interior 3 of the cylinder 1 an operational medium is filled without leaving any air gap. A disc-like piston 4 is disposed in the interior 3 of the cylinder and is reciprocably movable in the axial direction of the cylinder. To the piston 4 one end of a piston rod 5 is fixed. The piston rod 5 is slidably inserted in a liquid-tight fashion into a bore 2a provided in the axial direction of the end cap member 2 and aligned with the axis of the cylinder 1. The outer end, shown broken away, of the piston rod 5 is coupled directly to a bumper or a body of an automobile and an impact load applied to the bumper is also applied to the piston rod 5 in a direction of an arrow in FIG. 2.

The outer diameter of the piston 4 is made somewhat smaller than the inner diameter of the cylinder 1 to define an annular orifice 6 between the outer peripheral surface of the piston 4 and the inner wall surface of the cylinder 1. Since the cylinder 1 has the same inner diameter throughout the length thereof, the orifice 6 has such a fixed cross sectional area as allows the passage of a prescribed amount of the operational medium and acts as a fixed orifice.

The end cap member 2 has an outer cylindrical metal member, with a flange portion 7a, inner cylindrical metal member 8 having the bore 2a provided at the axial direction thereof and a flexible member 9 secured between the outer and inner cylindrical members 7 and 8, and has an external thread provided at the outer peripheral surface of the outer member 7. The external thread of the outer member 7 is screwed into the internal thread provided in the open end 1a of the cylinder 1 to the extent that the flange portion 7a is abutted against the open end surface of the cylinder. A seal member 10 assures a liquid-tight connection between the outer member 7 and open end 1a of the cylinder 1. Another seal member 11 is provided in a liquid-tight fashion between the piston rod 5 and the inner member 8. The flexible member 9 is made of such a high flexible material as rubber, synthetic resin etc.

When no impact load is applied to the piston rod 5, the piston 4 is held in an initial position as shown in FIG. 1 in which it is abutted against the inner end surface of the outer member 7. When an impact load F is applied, for example, through the bumper of the automobile to the piston rod 5 in a direction of an arrow in FIG. 2, the piston rod 5 is forced into the interior 3 of the cylinder 1 and at the same time the piston 4 is moved in a rightward direction from the initial position shown in FIG. 1. As a result, the inner volume of the cylinder 1 decreases by the volume of the piston rod 5 forced into the interior of the cylinder 1, causing the operational medium to be compressed by that decrease and giving rise to increased pressure in the cylinder 1. With the increased pressure of the operational medium represented by $p$, the pressure $p$ acts on the cap member 2 to cause the flexible member 9 of the cap member 2 to be resiliently deformed outward as shown in FIG. 2 to permit the inner member 8 to be displaced outward. In FIG. 3 solid lines indicate the cap member 2 in a prestressed state and dotted lines indicate the cap member 2 in a deformed state. As shown in FIG. 3 the flexible member 9 is resiliently deformed to cause the inner member 8 to be laterally displaced in the axial direction of the cylinder 1. As a result, the piston rod 5 is held always in a horizontal direction.

The further the piston rod 5 is forced into the interior 3 of the cylinder 1, the greater the deformation of the flexible member 9. Since that inner volume decrease caused by the piston rod 5 forced into the interior of the cylinder 1 is compensated, the pressure of the operational medium is not rapidly raised and an operation is continued substantially under the pressure $p$. Consequently, during the operation, the piston 4 and thus the piston rod 5 receive, as a reaction force, a sum of the substantially constant pressure $p$ of the operational medium and a fluid resistance involved when the operational medium is passed through the orifice 6. This means that the piston 4 and thus the piston rod 5 continue to receive a substantially constant reaction force. Therefore, the damper exhibits an excellent shock absorbing characteristic. When an impact load F ceases to exist, the inner member 8 is returned to the original position under the resilient force of the flexible member 9 and at the same time the piston 4 is brought back to the initial position.

By suitably selecting a relation between the pressure $p$ of the operational medium and the extent of deformation of the flexible member 9 there can be obtained various dampers having desired shock absorbing characteristics. When the temperature of the operational medium is varied, the flexible member 9 of the cap member 2 is resiliently deformed due to variation in the pressure of the operational medium and a substantially constant shock absorbing characteristic is, therefore, maintained. With the embodiment shown in FIG. 1 the flexible member 9 made of rubber etc. is incorporated in the cap member 2 and, therefore. the pressure of the operational medium is kept substantially constant. This obviates the necessity of providing any air chamber within the cylinder 3. As a result, entry of air into the operational medium is entirely prevented. Furthermore, it is not necessary to provide any partition wall, such as a free piston, as is found in a conventional damper. According to this invention, therefore, it is possible to obtain a reliably operable damper without requiring any particular precision machining and it is also possible to provide a simple damper construction.

FIGS. 4 to 9 show modified embodiments. These modified embodiments provide improvements over the first embodiment shown in FIGS. 1 to 3 and are all similar to the latter embodiment in that the flexible member is incorporated in the cap member. Therefore, the same reference numeral is employed to designate parts or members corresponding to those shown in FIGS. 1 to 3.

Figure 4:
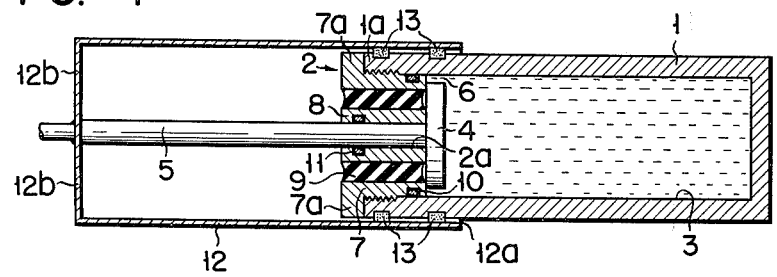
FIG. 4 is a cross sectional view of a damper according to a second embodiment of this invention, in which a guide cover is provided.

With a damper shown in FIG. 4 a guide cover 12 is additionally provided. The guide cover 12 is cylindrical in shape and open at its one end. The open end 12a of the guide cover 12 is fitted over the open end 1a of a cylinder 1 so that the guide cover 12 is slidably movable in an axial direction of the cylinder 1. To make the sliding movement of the guide cover 12 more smooth, a plurality of slide guides 13 impregnated with a lubricating oil are disposed between the open end 12a of the guide cover 12 and the open end 1a of the cylinder 1. The guides 13 are fitted into associated grooves provided in the outer periphery of the open end 1a of the cylinder 1. The slide guide 13 is not ring-like in shape and does not function as a seal for effecting an airtight seal between the guide cover 12 and the cylinder 1. An air trapped within the guide cover 12 can be passed through a clearance defined between the open end 12a of the guide cover 12 and the open end 1a of the cylinder 1, as it is forced into the cylinder 1. An air vent hole may be provided at any suitable place in the guide cover 12. A piston rod 5 is passed through the closed end wall 12b of the guide cover 12 and is secured by welding etc. to the closed end wall 12b of the guide cover 12 so that the guide cover 12 and piston rod 5 are slidably moved as a unit. The guide cover 12 performs the double function of firstly guiding the piston rod 5 always in a horizontal direction without deviation and secondly preventing deposition of dirt and dust on the outer periphery of a cap member 2.

Figure 5:
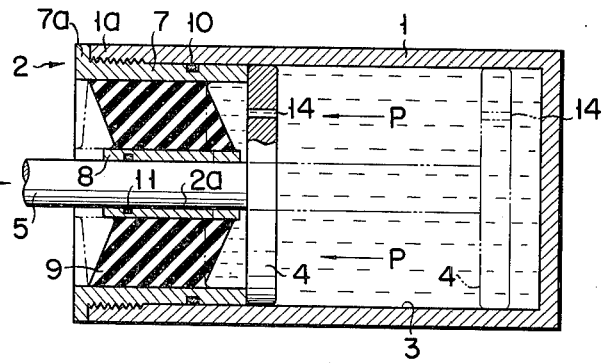
FIGS. 5 to 9 are cross sectional views of dampers according to further embodiments of this invention.
Figure 6:
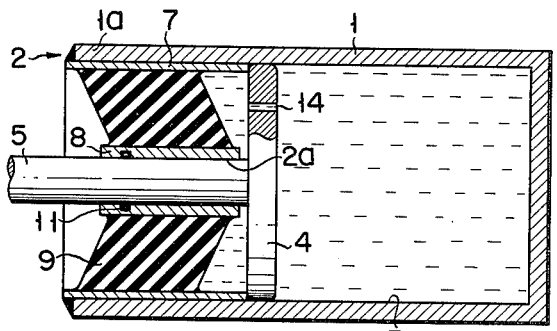

The embodiments shown in FIGS. 5 to 9 are similar to each other in that a flexible member 9 of a cap member 2 projects in an offset fashion toward the interior 3 of a cylinder 1 and that a plurality of through bores 14 are provided in a piston 4 in place of the annular orifice of the first embodiment. Even when an impact load is applied to a piston rod 5 and thus the piston 4, the flexible member 9 is not displaced outward beyond the open end 1a of the cylinder 1, as shown in FIG. 5, due to the offset configuration of the flexible member. As a result, no extra space is required in mounting a damper and no outward appearance is impaired. The through bore 14 formed in the piston 4 represents a substitute for the annular orifice of the first embodiment and performs the same function as the fixed orifice 6 of the first embodiment. The piston 4 is slidably contacted in a liquid-tight fashion with the inner wall surface of the cylinder 1.

Let us now explain the structural differences of the embodiments of FIGS. 5 to 9. With the damper of FIG. 5 the cap member 2 is screwed, as in the first embodiment, into the open end 1a of the cylinder 1. With the damper of FIG. 6 the cap member 2 is secured by welding to the open end 1a of the cylinder 1 and no seal member 10 is provided between the cap member 2 and the cylinder 1.

Figure 7:
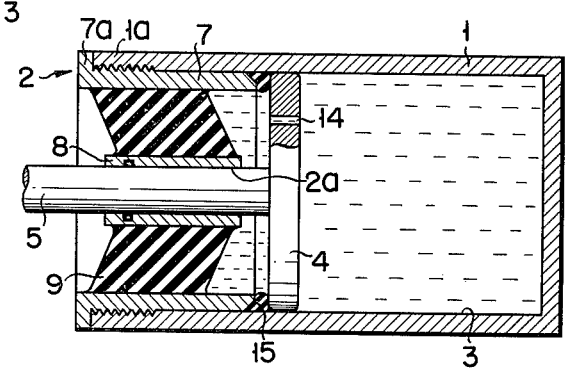

With the damper of FIG. 7 a seal member 15 made of rubber is secured on the inner end surface of an outer member 7 of the cap member 2 in a manner that it is intimately contacted with the inner wall surface of the cylinder 1. This obviates the necessity of providing a groove in the outer peripheral surface of the outer member 7 and fitting a seal member 10 into the groove as in the first embodiment. Furthermore, the mounting of the end cap member 2 to the cylinder 1 can be readily effected.

Figure 8:
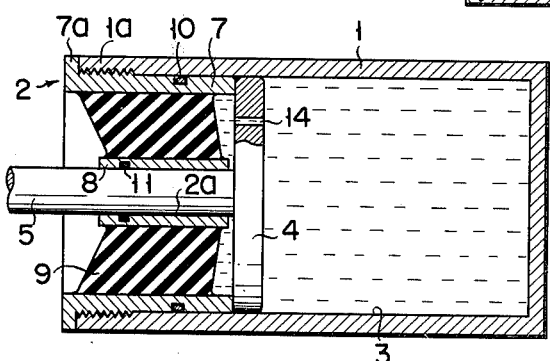
Figure 9:
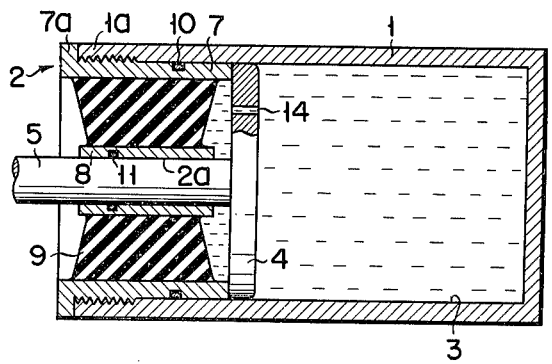

With the dampers of FIGS. 8 and 9, further consideration is paid to the configuration of the flexible member 9. That is, the outer member side of the flexible member 9 is made wider than the inner member side of the flexible member 9. During the deformation of the flexible member 9 the outer member side of the cap member 2 is most subjected to a load in consideration of "strength of materials". Since with the dampers of FIGS. 8 and 9 the outer member side of the flexible member is made wider than the inner member side of the flexible member 9, a stress is uniformly distributed over the flexible member 9 and any local concentration of load is therefore prevented. An advantage is obtained when the flexible member 9 is resiliently deformed to a great extent due to a great impact load on the piston rod. It is possible to provide a durable damper having a lengthy service life.

As understood from FIGS. 8 and 9, the dampers of FIGS. 8 and 9 are identical to each other, except that the respective flexible members 9 are somewhat different in configuration.

What I claim is:

1. A damper comprising a cylinder having an open end at one end;
   a cap member fitted to the open end of the cylinder to permit an operational medium to be sealed in a liquid-tight fashion into the interior of the cylinder, said cap member including an outer cylindrical metal member screwed into the open end of the cylinder, an inner cylindrical metal member having an inner bore provided at the axial direction thereof, and a flexible member secured between the inner and outer cylindrical metal members;
   a piston disposed within the cylinder to be movable in the axial direction of the cylinder and normally positioned in an initial position;
   a piston rod slidably inserted through said inner bore of the inner cylindrical metal member to be movable in the axial direction of the cylinder and secured at one end to the piston; and
   an orifice means for imparting a fluid resistance of the operational medium as a reaction force to the piston when the piston is moved from the initial position in accordance with the sliding movement of the piston rod,
   said flexible member being adapted to be resiliently deformed outward in the axial direction of the cylinder to permit the inner cylindrical metal member to be displaced outward due to the operational medium in the cylinder being subjected to increased pressure as the piston rod is forced more inwardly into the cylinder, and in consequece the piston is moved from the initial position, whereby increase in the pressure of the operational medium is controlled.

2. A damper according to claim 1, wherein said outer cylindrical metal member is provided with a flange portion to be abutted against an open end surface of the cylinder.

3. A damper according to claim 1, wherein said cap member further includes a seal member provided between the outer cylindrical metal member and the open end of the cylinder, and another seal member provided between the inner cylindrical metal member and the piston rod.

4. A damper according to claim 1, wherein said outer cylindrical metal member is provided with a flange portion to be abutted against an open end surface of the cylinder; and said cap member further includes a seal member provided between the outer cylindrical metal member and the open end of the cylinder, and another seal member provided between the inner cylindrical metal member and the piston rod, said damper further comprising a guide cover having an open end and a closed end, the open end of said guide cover being inserted over the open end of the cylinder to be slidably movable in the axial direction of the cylinder and the closed end of said guide cover being rigidly secured to the piston rod so that the guide cover is slidably moved in accordance with the sliding movement of the piston rod; and a plurality of slide guides impregnated with a lubricating oil and disposed between the open end thereof and the open end of the cylinder.

5. A damper according to claim 1, wherein said flexible member projects in an offset fashion toward the interior of the cylinder.

6. A damper according to claim 1, further comprising a guide cover having an open end and a closed end, the open end of said guide cover being inserted over the open end of the cylinder to be slidably movable in the axial direction of the cylinder and the closed end of said guide cover being rigidly secured to the piston rod so that the guide cover is slidably moved in accordance with the sliding movement of the piston rod.

7. A damper according to claim 6, further comprising a plurality of slide guides impregnated with a lubricating oil and disposed between the open end of the guide cover and the open end of the cylinder.

8. A damper according to claim 1 further comprising a seal member made of rubber and disposed on the inner end of the outer cylindrical member of the cap member in a manner to be intimately contacted with the inner peripheral surface of the cylinder, whereby a liquid-tight connection is assured between the outer cylindrical member and the inner peripheral surface of the cylinder.

9. A damper according to clam 1 wherein the flexible member of said cap member has its outer cylindrical member side made wider than its inner cylindrical member side.

* * * * *

UNITED STATES PATENT OFFICE
CERTIFICATE OF CORRECTION

Patent No. 3,948,498          Dated April 6, 1976

Inventor(s)  HIRANO

It is certified that error appears in the above-identified patent and that said Letters Patent are hereby corrected as shown below:

On the face of the Grant, delete the foreign application priority information of "September 25, 1973, Japan 48-11593(U)".

Signed and Sealed this

Fourteenth Day of September 1976

[SEAL]

*Attest:*

RUTH C. MASON
*Attesting Officer*

C. MARSHALL DANN
*Commissioner of Patents and Trademarks*